United States Patent
Dykstra (12) 
(10) Patent No.: US 11,421,519 B2
(45) Date of Patent: Aug. 23, 2022

(54) OPTIMAL CONTROL OF A DRILL PATH USING PATH SMOOTHING

(71) Applicant: Halliburton Energy Services, Inc., Houston, TX (US)

(72) Inventor: Jason D. Dykstra, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 926 days.

(21) Appl. No.: 14/911,373

(22) PCT Filed: Oct. 11, 2013

(86) PCT No.: PCT/US2013/064572
§ 371 (c)(1),
(2) Date: Feb. 10, 2016

(87) PCT Pub. No.: WO2015/053782
PCT Pub. Date: Apr. 16, 2015

(65) Prior Publication Data
US 2016/0186551 A1    Jun. 30, 2016

(51) Int. Cl.
*E21B 44/00*       (2006.01)
*E21B 7/04*        (2006.01)
*E21B 47/12*       (2012.01)
*E21B 47/02*       (2006.01)
*G06Q 40/00*       (2012.01)

(52) U.S. Cl.
CPC ............ *E21B 44/00* (2013.01); *E21B 7/04* (2013.01); *E21B 47/02* (2013.01); *E21B 47/12* (2013.01); *G06Q 40/12* (2013.12)

(58) Field of Classification Search
CPC ............ E21B 7/04; E21B 47/022; E21B 7/06
See application file for complete search history.

(56) References Cited

U.S. PATENT DOCUMENTS 5,419,405 A * 5/1995 Patton ................... E21B 7/04
                                                   175/27
5,585,726 A    12/1996 Chau
6,523,623 B1   2/2003 Schuh
(Continued)

FOREIGN PATENT DOCUMENTS

CN    1910589 A    2/2007
CN    102822752 A  12/2012
(Continued)

OTHER PUBLICATIONS

International Search Report and The Written Opinion of the International Searching Authority, or the Declaration, dated Mar. 7, 2014, PCT/US2013/064572, 10 pages, ISA/US.
(Continued)

*Primary Examiner* — Kandasamy Thangavelu
(74) *Attorney, Agent, or Firm* — Haynes and Boone, LLP (57) ABSTRACT

A drilling assembly control system is designed to control drill bit orientation such that a well path is followed that minimizes oscillations and deviations. When a deviation from the intended well path is detected, a predictive module models the deviated path. Using the modeled path, an optimization module utilizes a cost function and various constraints to analyze alternative correction paths in order to determine which correction path provides the most non-tortuous return to the intended well path.

15 Claims, 9 Drawing Sheets

(56) References Cited

U.S. PATENT DOCUMENTS

| | | | | |
|---|---|---|---|---|
| 2003/0024738 A1* | 2/2003 | Schuh | ............... | E21B 7/04 175/45 |
| 2009/0000823 A1* | 1/2009 | Pirovolou | ............... | E21B 7/04 175/61 |
| 2009/0090555 A1* | 4/2009 | Boone | ............... | E21B 7/04 175/45 |
| 2010/0185395 A1 | 7/2010 | Pirovolou et al. | | |
| 2011/0036631 A1* | 2/2011 | Prill | ............... | E21B 7/06 175/57 |
| 2011/0172976 A1* | 7/2011 | Budiman | ............... | E21B 47/022 703/2 |
| 2012/0024606 A1* | 2/2012 | Pirovolou | ............... | E21B 7/04 175/61 |
| 2012/0285701 A1 | 11/2012 | Cheng et al. | | |
| 2013/0048383 A1 | 2/2013 | Panchai et al. | | |
| 2013/0140037 A1* | 6/2013 | Sequeira, Jr. | ............... | E21B 7/04 166/369 |
| 2013/0341092 A1* | 12/2013 | Hay | ............... | E21B 7/04 175/24 |
| 2015/0096805 A1* | 4/2015 | Kruspe | ............... | E21B 7/04 175/45 |

FOREIGN PATENT DOCUMENTS

| | | |
|---|---|---|
| CN | 103046868 A | 4/2013 |
| GB | 2534702 B | 4/2017 |

OTHER PUBLICATIONS

Search Report issued for patent application No. CN 2013800792790, dated Feb. 5, 2018, 2 pages.

Pemeder, "A Three-Dimensional Mathematical Model of Directional Drilling," A Dissertation Submitted to the University of Minnesota, Jan. 2013.

Substantive Examination Adverse Report issued for Malaysian Patent Application No. PI 2016700451 dated Jul. 12, 2019, 3 pages.

* cited by examiner

OPTIMAL CONTROL OF A DRILL PATH USING PATH SMOOTHING

The present application is a U.S. National Stage patent application of International Patent Application No. PCT/US2013/064572, filed on Oct. 11, 2013, the benefit of which is claimed and the disclosure of which is incorporated herein by reference in its entirety.

FIELD OF THE DISCLOSURE

The present disclosure relates generally to geosteering in hydrocarbon reservoirs and, more specifically, to a drilling assembly steering system designed to control drill bit orientation such that a pathway is followed that minimizes tortuosity.

BACKGROUND

Hydrocarbon fossil fuels are a limited resource because of their associated cost of production. As easily accessible resources are used, new technology is necessary to minimize the cost of production and increase accessibility. One of the main drivers for the shale boom in North American is directional drilling. Using this technology to drill long horizontal wells that can be hydraulically fractured has made new resources available and driven the price of natural gas down throughout the past five years.

In simple terms, directional drilling is the practice of drilling a wellbore using a system that provides control of the drill bit orientation or applied side forces at the bit. This system allows drilling along a controlled path in almost any direction. Beyond drilling long horizontal boreholes, directional drilling can also create multiple wells using one rig, extending reachable locations, relieving blowing wells with reduced loss, and avoiding hard-to-drill formations. To enable control of the bit, the bottom hole assembly ("BHA") is equipped with a mechanism to either apply force to the wall of the borehole or change the direction in which the bit is pointing in relationship to the BHA. These systems are known as either "push-the-bit," or "point-the-bit," depending on how the mechanism operates.

Although directional drilling has been in practice for some time, it still poses several challenges. A key challenge related to directional drilling is to produce a smooth wellbore while closely following the designed path. A non-smooth, or tortuous, wellbore can compromise well completion and lead to stuck and fatigued pipe. Also, a large deviation from the designed path can result in collisions with nearby wells, missing the target location, or compromise drilling efficiency.

Other challenges exist as well, particularly those related to drilling automation (i.e., development of autonomous drilling systems that require little or no intervention from an operator). The difficulty with drilling automation derives from the complexity of the process that includes the interaction of the drilling system with the borehole and fluid (mud) flow. The presences of complex downhole vibrations, such as bit bounce, bit whirl, and stick-slip, make it more difficult to automate the process. Moreover, only a limited number of sensors can be placed in the confined space or survive the harsh downhole conditions. Also, the measurements are usually contaminated with high noise levels, and can only be transmitted at low rates with long transmission delays.

Accordingly, there is a need in the art for an autonomous geosteering system for a drilling assembly that utilizes an understanding of the bit-wellbore interaction to produce a smooth wellbore.

DESCRIPTION OF ILLUSTRATIVE EMBODIMENTS

Illustrative embodiments and related methodologies of the present disclosure are described below as they might be employed in a drilling assembly steering system designed to control drill bit orientation such that a pathway is followed that minimizes tortuosity. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the disclosure will become apparent from consideration of the following description and drawings.

Figure 1:
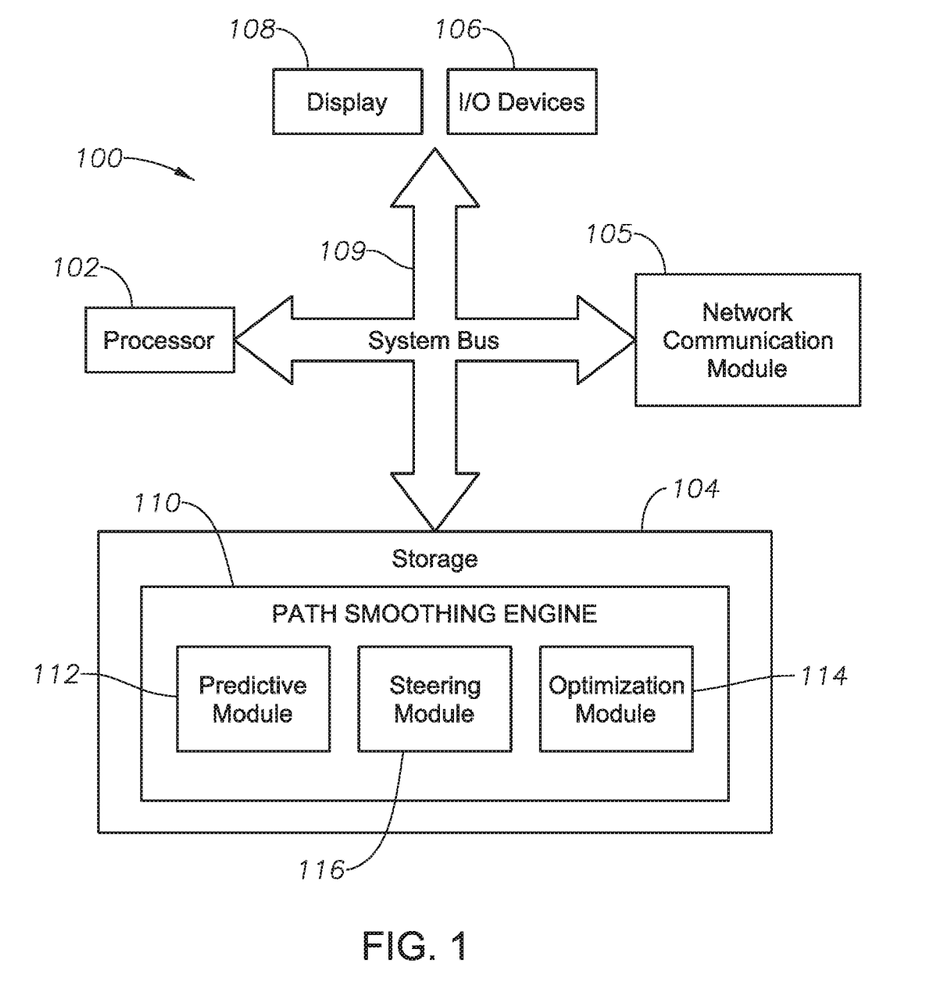
FIG. 1 illustrates a block diagram of a well path smoothing system according to an illustrative embodiment of the present disclosure.

FIG. 1 shows a block diagram of wellbore path smoothing system 100 according to an illustrative embodiment of the present disclosure. As will be described herein, illustrative embodiments of wellbore path smoothing system 100 provides a control system to control the drill bit orientation such that a path is followed while minimizing tortuosity. "Tortuosity" is defined herein as the condition of the wellbore in which it is twisted, crooked, oscillating, or likewise deviated. As described below, when wellbore path smoothing system 100 detects a deviation from the intended well path, a predictive module models the deviated path along a certain distance. Using the modeled deviated path, an optimization module then utilizes a cost function and various constraints to analyze alternative correction paths in order to determine which correction path provides the least tortuous return to the intended well path. The cost function is comprised of various competing constraints which, when taken as a whole, result in a smooth correction path. Accordingly, illustrative embodiments of the present disclosure provide optimal control and automation of a smooth drill path.

Referring to FIG. 1, wellbore path smoothing system 100 includes at least one processor 102, a non-transitory, computer-readable storage 104, transceiver/network communication module 105, optional I/O devices 106, and an optional display 108 (e.g., user interface), all interconnected via a system bus 109. Software instructions executable by the processor 102 for implementing software instructions stored within path smoothing engine 110 in accordance with the illustrative embodiments described herein, may be stored in storage 104 or some other computer-readable medium.

Although not explicitly shown in FIG. 1, it will be recognized that wellbore path smoothing system 100 may be connected to one or more public and/or private networks via one or more appropriate network connections. It will also be recognized that the software instructions comprising path smoothing engine 110 may also be loaded into storage 104 from a CD-ROM or other appropriate storage media via wired or wireless methods.

Moreover, those skilled in the art will appreciate that the disclosure may be practiced with a variety of computer-system configurations, including hand-held devices, multi-processor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof in a computer system or other processing system.

In certain illustrative embodiments, path smoothing engine 110 comprises predictive module 112, optimization module 114 and steering module 116. Predictive module 112 is utilized to generate a comprehensive physics-based dynamic model that predicts what the well path will be based upon various inputs. As such, predictive module 112 performs the geological interpretation and earth modeling functions of the present disclosure that enable, for example, formation visualization and real-time geosteering. To achieve this, as will be described in further detail below, predictive module 112 uploads real-time data reflecting various tortuosity-related drilling parameters of the downhole assembly, performs various interpretational and forward modeling operations on the data, and utilizes display 108 to provide desired visualizations of a corresponding deviated well path. In addition, predictive module 112 may also detect faults, estimate the location of the bit relative to the intended drill path, and predict downhole vibrations or other tortuosities.

Still referring to FIG. 1, optimization module 114 analyzes the deviated path modeled by predictive module 112 to thereby determine the most optimal correction path to return the drilling assembly back to the intended path. To achieve this, optimization module 114 utilizes a cost function and constraints to analyze various candidate correction paths to determine the most optimal path. As will be described in more detail below, the cost function is made up of competing constraints which analyze the well path to curvature behavior of the candidate correction paths. As a result, the correction path determined by optimization module 114 to be the most optimal is smoothed.

Steering module 116 controls the steering functions of the drilling assembly. Once the most optimal correction path has been determined, optimization module 112 generates corresponding drilling parameters and transmits them to steering module 116. In turn, steering module 116 communicates the drilling parameters to the drilling assembly to steer it accordingly.

Moreover, in certain other illustrative embodiments, path smoothing engine 110 may be in communication with various other modules and/or databases. For example, such databases may provide robust data retrieval and integration of historical and real-time well related data that spans across all aspects of the well construction and completion processes such as, for example, drilling, cementing, wireline logging, well testing and stimulation. Moreover, such data may include, for example, well trajectories, log data, surface data, fault data, etc. In such embodiments, path smoothing engine 110 may also provide, for example, the ability to select data for a multi-well project, edit existing data and/or create new data as necessary to interpret and implement a 2D or 3D well visualization of various well paths.

Again, as previously described, illustrative embodiments of predictive module 112 generate a physics-based dynamic model of a deviated path. Such a model enables fundamental understanding of the process and facilitates the design of a model-based adaptive parametric controller as also described herein. As a result, wellbore path smoothing system 100 is able to accurately estimate downhole conditions necessary for process automation.

An illustrative methodology by which predictive module 112 generates the dynamic models will now be described. In one example, predictive module 112 generates a dynamic model of the drilling assembly using four degrees of freedom: rotation, axial motion, and bending along two lateral directions. The model uses a lumped mass-spring-damper system derived from the governing equations of a flexible beam under certain boundary conditions. The lumped masses are partitioned and aligned according to the geometry of the drilling assembly components, resulting in a non-evenly distributed drilling assembly model. The simulation models described herein are generated using simulation and model-based design software, as will be understood by those ordinarily skilled in the art having the benefit of this disclosure. Moreover, illustrative simulation results presented below illustrate the existence of three illustrative types of bit vibrations (i.e., bit bouncing, bit whirling and stick-slip).

Illustrative Drilling Assembly Configuration:

Borehole trajectory is mainly controlled by the direction of the bit, which is steered by the drilling assembly. As discussed previously, there are two main methods to direct the bit using the drilling assembly: push-the-bit and point-the-bit. While the former system applies a side force against the borehole wall to force the bit in the desired direction, the latter applies rotary torque on the driveshaft to bend the drilling assembly and tilt the bit. The description provided herein, however, focuses on drilling assemblies that employ point-the-bit type steering. However, those ordinarily skilled in the art having the benefit of this disclosure will understand that the present disclosure can also be applied with push the bit type steering.

Figure 2:
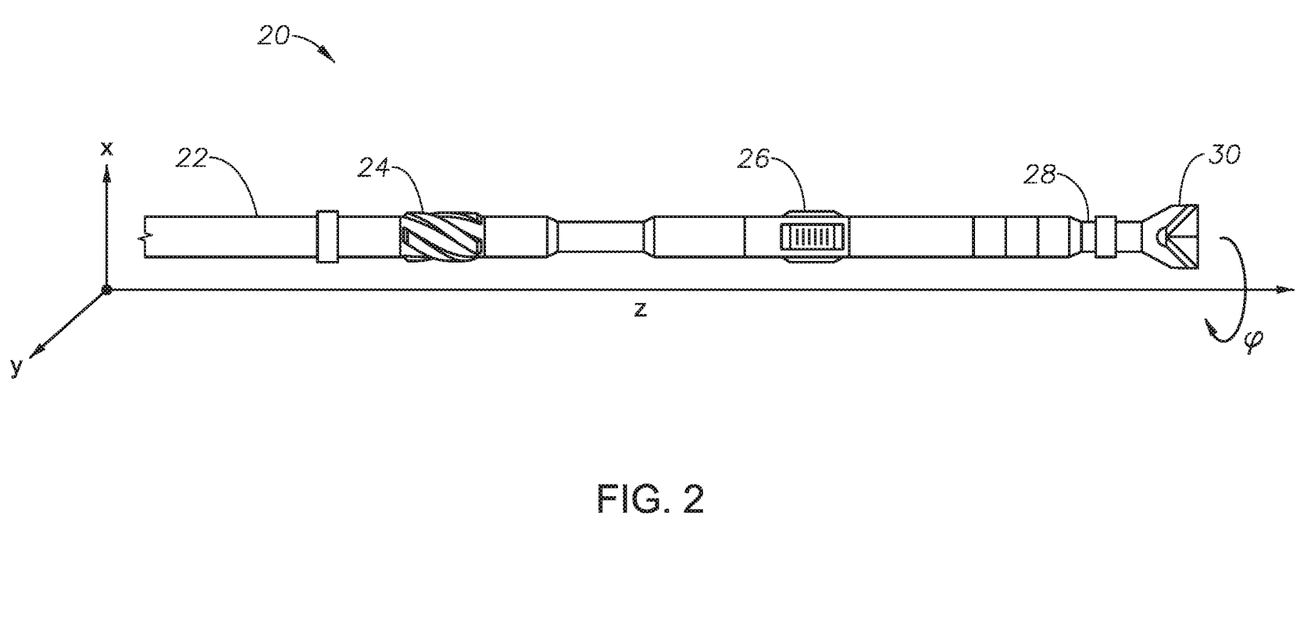
FIG. 2 illustrates a drilling assembly according to certain illustrative embodiments of the present disclosure.

To further illustrate the predictive model, an illustrative drilling assembly is illustrated in FIG. 2. Drilling assembly 20 consists of a drill collar 22, stabilizers 24, sensor packages 26, a bending shaft 28, and a bit 30. The main purpose of stabilizers 24 is to stabilize drilling assembly 20 within the borehole, reducing vibrations, restricting lateral movements, and providing support forces. Stabilizers 24 also serve as steersman of bit 30, when employing the push-the-bit mechanism. A point-the-bit steering mechanism is utilized to flex bending shaft 28 using a pair of eccentric rings controlled by a gear and clutch system. By controlling the amount of bending of shaft 28, bit 30 can be pointed in the desired direction. Illustrative drilling assembly 20 has a sensor package installed that can include strain gauges, pressure measurements, vibration measurements, and an inertial sensing package.

Decoupled Motion of Drilling Assembly Vibrations:

FIG. 1 further illustrates drilling assembly 20 along with four degrees of motion: one rotational motion, $\varphi$; one axial motion, z; and bending motions along the two lateral directions, x and y. The bending of drilling assembly 20 is relatively small and the influence of bending one axis is assumed to have negligible influence on the bending of other axes. A maximum curvature of a borehole (also known as dogleg severity) that can be introduced by the bending of drilling assembly 20 is approximately 15° per 100 ft drilled. This is equivalent to a radius of curvature of 382 ft (116.5 m). Compared to a typical drilling assembly length of 40 ft (12.2 m), the deflections corresponding to the radius of curvature are small. Thus, the four directions of motion are assumed to be decoupled, and the nonlinearities associated with the interactions may be neglected.

The contact between drilling assembly 20 and the wellbore couple the equations of motion for each degree of freedom. These interactions occur at the drilling assembly components, such as stabilizer 24, drive shaft 28, and, most importantly, at bit 30. For example, the frictional forces at the stabilizer-wellbore contacts affect the bending as well as rotational motion. Therefore, the dynamics of drilling assembly 20 can be assumed to be decoupled along the four degrees of motion, except at the drilling assembly-wellbore contact points.

Modeling Drilling Assembly Bending:

Predictive module 112 may model the bending of drilling assembly 20 is a variety of ways. In one such embodiment, the diameter of drilling assembly 20 is of the order of several inches, which is considerably smaller compared to its length, which is of the order of tens of feet. Therefore, the bending of drilling assembly 20 can be modeled using a flexible beam theory. There are four common beam models: Euler-Bernoulli, Rayleigh, Shear, and Timoshenko. In this example, the effects by rotary inertia are neglected because of the relatively small thickness of drilling assembly 20, and only shear deformations of the drilling assembly 20 are considered. Hence, the shear beam theory is used to model drilling assembly 20. The corresponding equations of motion are given by:

$$\rho A \frac{\partial^2 v(z,t)}{\partial t^2} - k'GA\left(\frac{\partial^2 v(z,t)}{\partial z^2} - \frac{\partial \alpha(z,t)}{\partial z}\right) = f(z,t), \text{ and} \quad \text{Eq. (1)}$$

$$\frac{\partial^2 \alpha(z,t)}{\partial z^2} + k'GA\left(\frac{\partial v(z,t)}{\partial z} - \alpha(z,t)\right) = 0, \quad \text{Eq. (2)}$$

where v is the dimensionless displacement, $\alpha$ is the angle of rotation attributed to the bending moment, and k', $\rho$, A, G, z, and t are the shape factor, the dimensionless density, area, shear modulus, axial coordinate, and time, respectively. The function $f(z,t)$ represents the external forces acting on drilling assembly 20. For the illustrative drilling assembly in consideration, this external force is zero, except at stabilizers 24, drive shaft 28, and bit 30, where drilling assembly 20 is in contact with the wellbore. The homogenous solution without any external forces is determined by:

$$\frac{\partial^4 v(z,t)}{\partial z^4} - \frac{\rho}{k'G}\frac{\partial^4 v(z,t)}{\partial z^2 \partial t^2} + \rho A \frac{\partial^2 v(z,t)}{\partial t^2} = 0, \text{ and} \quad \text{Eq. (3)}$$

$$\frac{\partial^4 \alpha(z,t)}{\partial z^4} - \frac{\rho}{k'G}\frac{\partial^4 \alpha(z,t)}{\partial z^2 \partial t^2} + \rho A \frac{\partial^2 \alpha(z,t)}{\partial t^2} = 0. \quad \text{Eq. (4)}$$

Note that Equations 3 and 4 are decoupled. Only Equation 3 corresponding to the transverse deflection v(z, t) is of interest in this example. By the method of separation of variables, the solution to Equation 3 can be expressed as:

$$v(z,t)=T(t)W(z) \quad \text{Eq. (5),}$$

$$T(t)=d_1 \sin \omega t + d_2 \cos \omega t \quad \text{Eq. (6), and}$$

$$W(z)=C_1 \sin az + C_2 \cos az + C_3 \sin h\, bz + C_4 \cos h\, bz \quad \text{Eq. (7),}$$

where the coefficients $C_i$ and $d_i$, along with $\omega$, a, and b, are to be determined by boundary and initial conditions. Note that a series of natural frequencies and modes exists corresponding to the associated coefficients; $d_i$ is set to 1 because of redundancy.

Boundary and Initial Conditions:

To further illustrate generation of an illustrative predictive model, the simplest configuration of drilling assembly 20 is assumed, where stabilizer 24 is present at one end of drilling assembly 20 and bit 30 at other. Stabilizer 24 fixes the center location of drilling assembly 20 and its lateral displacement is always zero. Also, drilling assembly 20 is always perpendicular to the cross-section at stabilizer 24. These two physical restrictions lead to a clamped end at stabilizer 24. For bit 30, although it has limited space to move, it can be considered to be a free end under the assumption of small deflections. Therefore, drilling assembly 20 could be categorized as a clamped-free beam for the purposes of boundary conditions. As a consequence, the natural frequencies and the vibration modes can be determined, as will be understood by those ordinarily skilled in the art having the benefit of this disclosure.

To relieve the computational burden, a zero initial condition is assumed (i.e., v(x,0)=0). With one boundary condition inherited from the decoupled Equation 3, two boundary conditions associated with stabilizer 24, and two boundary conditions associated with bit 30, all five unknowns in Equation 5-7 can be determined. Finally, the particular solution corresponding to the external force function f(z,t) can be found by suitably and accurately modeling the external forces on drilling assembly 20 that govern the bit direction and the curvature of drilling assembly 20.

Illustrative Drilling Assembly Model—Lumped Parameter Method:

In this example, the rotational and axial dynamics are modeled using second order partial differential equations ("PDE") in which all the coefficients have clear physical meaning. These, along with the bending dynamics in the previous section, can be solved using finite element methods ("FEMs"). However, it is neither practical nor usable to implement FEM approaches is because of the limited computing resources in the field and downhole. Therefore, it requires an affordable method that uses less computing power while providing sufficiently accurate results.

Therefore, illustrative embodiments of the present disclosure utilize a lumped-parameter method to implement the dynamics of drilling assembly 20 in real-time. In doing so, path smoothing engine 110 discretizes drilling assembly 20 into several mass-spring units. Each unit is abstracted as a weightless spring and a concentrated mass. However, compared to FEM, the number of masses can be significantly reduced by the lumping procedure.

Illustrative embodiments of predictive module 112 utilizing the lumped-parameter method essentially calculate the equivalent masses and spring constants by applying modal analysis. It helps ensure that the system with lumped masses produces the same frequency responses as the real system. For example, assuming drilling assembly 20 is evenly divided into N sections, and the length of each section is $l^*=L^*/N$, and $L^*$ is the length of drilling assembly 20. Considering the solution in Equation 5, the kinetic energy of i-th segment $E^*_{ki}$ can be expressed as:

$$E^*_{ki} = \frac{\rho^*_i}{Z} \dot{T}^*(t^*) \int_{(i-1)l^*}^{il^*} W^{*2}(z)\,dz, \qquad \text{Eq. (8)}$$

where $\rho^*_i$ is the unit-length density. Note that the variables with a $*$ are dimensional variables. For the lumped-parameter method, the equivalent kinetic energy of i-th mass is:

$$\bar{E}^*_{ki} = \tfrac{1}{2} m_i \dot{T}^*(t^*) W^{*2}(il^*) \qquad \text{Eq. (9).}$$

Therefore, the equivalent masses can be obtained by combining Equations 8 and 9:

$$m_i = \frac{\rho^*_i \int_{(i-1)l^*}^{il^*} W^{*2}(z)\,dz}{W^{*2}(il^*)}, \qquad \text{Eq. (10)}$$

with W being the shape of the bottom hole assembly. And, similarly, by equating the potential energy, the equivalent spring constants are:

$$k_i = \frac{E^* I^* \int_{(i-1)l^*}^{il^*} [W^{*\prime\prime}(z)]^2\,dz}{[W^{*\prime}(il^*) - W^{*\prime}((i-1)l^*)]^2}, \qquad \text{Eq. (11)}$$

where $E^*I^*$ is the uniform flexural rigidity of the steel pipe. Note that only the solution associated with the first natural frequency is used in this method. Fortunately, using the first mode can still produce a representative approximation.

One of the problems of the lumped-parameter method is that it assumes a constant external force at the drive shaft based on the PDE solution in Equations 5-7. However, the force is usually time-varying. Thus, it is difficult to determine the profile of the force in advance. In the current example, however, an adaptation scheme is proposed as a remedy.

Numerical calculations suggest that the order of the first natural frequency for a typical drilling assembly is about $10^3$ Hz. The downhole sensors and control signals are typically sampled at about 10 to 100 Hz, significantly slower than the drilling assembly vibrations. Therefore, the transient behavior of the vibrations, especially along two bending axes, can be neglected. In this adaptive strategy, at each time instant, the force of the drive shaft could be taken as a constant and then the coefficients of Equation 5 and 6 are re-determined. The lumped-parameter method subsequently recalculates the equivalent masses and spring constants. This procedure is repeated for each time instant and the lumped mass-spring systems are updated. Therefore, the model with adaptation could be used for vibration analysis and mitigation design.

Figure 3:
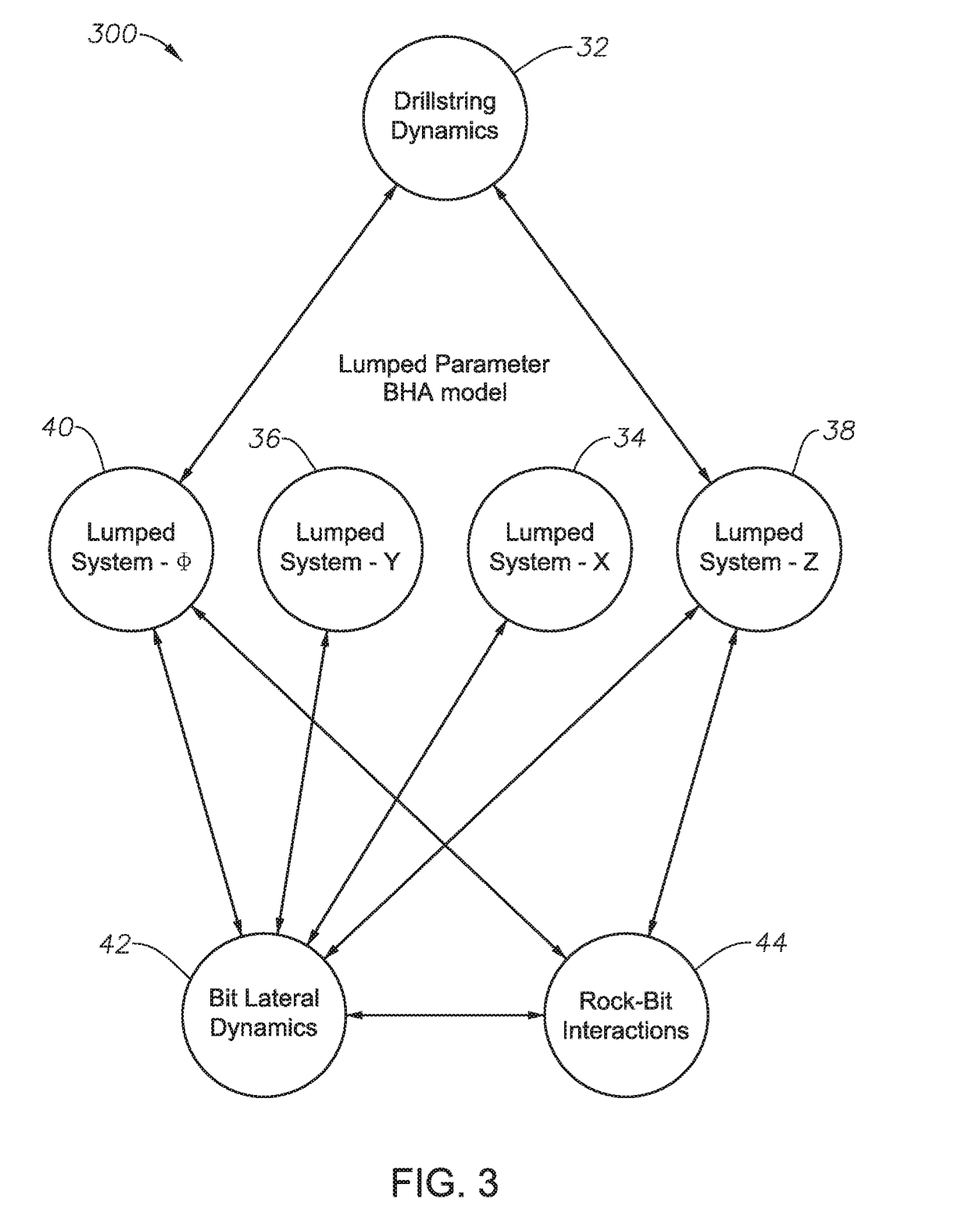
FIG. 3 is a schematic model of a drilling assembly divided into seven subsystems, according to certain illustrative embodiments of the present disclosure.

Illustrative Software Implementation of the Drilling Assembly Model:

Using the illustrative methodology described above, path smoothing engine 110, via predictive module 112, generates a predictive model of drilling assembly 20 along a wellbore. In this example, a model of drilling assembly 20 was implemented using simulation and model-based design software. FIG. 3 illustrates a schematic 300 of an illustrative model of drilling assembly 20 divided into seven subsystems. Drillstring Dynamics subsystem 32 implements the axial and rotational dynamics of the drilling assembly 20. Here, Drilling assembly 20 comprises thousands of feet of drill pipe. In the current example, drilling assembly 20 is modeled as a two-mass system connected to the top drive and drawworks at one end, and drilling assembly 20 at the other. The top drive applies torque at the surface, and the drawworks carries the load of the system. By changing the amount of load the drawworks carries, the weight on bit 30 will change.

Lumped-System-X 34 implements the dynamics of drilling assembly 20 along the x-axis, starting from the last mass of the drillstring up until bit 30. As previously described, the dynamics along each of the axes can be assumed decoupled, except for the forces at the contact points (i.e., the locations on drilling assembly 20 that interact with the wellbore). In this example, these contact points are assumed only at the locations of stabilizers 24. The lumped parameter method is used to discretize the various components in drilling assembly 20 into mass-spring systems. The mass and stiffness values for the each of these mass-spring systems are computed as described in Equations 10 and 11.

Lumped-System-Y 36 implements the dynamics of drilling assembly 20 along the y-axis up until bit 30. Because of the symmetry of motion along x and y axes, the modeling strategies and the parameters for the mass-spring lumped systems are the same to those along the x-axis. Note that these two subsystems do not account for the lateral dynamics of bit 30 because of its complex non-linear interactions with the wellbore. These interactions are modeled in separate subsystems and are coupled. Lumped-System-Z 38 implements the axial dynamics of drilling assembly 20 using the lumped parameter method. It includes two blocks: (1) drilling assembly 20 masses (except bit 30) that emulate the above lumped subsystems and (2) an individual block to solve the axial dynamics of bit 30. The response of the last element (i.e., bit 30 shows the axial propagation of bit 30 in the wellbore).

Lumped-System-$\varphi$ 40 solves for the rotational dynamics of drilling assembly 20. It is similar to the subsystem for axial dynamics (i.e., it has two separate blocks each for bit 30 and the other components of drilling assembly 20). Both the rotational and axial dynamics of drilling assembly 20 are significantly affected by the dynamics of bit 30 because of complex interactions with the wellbore and the rock. Therefore, these are coupled to account for the bit interactions, as shown in FIG. 3. Bit Lateral Dynamics 42 implements the complex lateral dynamics of bit 30. The complex non-linear behavior of bit 30 along lateral axes arises from the frictional forces because of the interaction of bit 30 with the wellbore and the well-bottom. In certain illustrative embodiments, these complex dynamics are modeled using a methodology as described A. Christoforou, and A. Yigit, "Fully Coupled Vibrations of Activately Controlled Drillstrings," *J. of Sound and Vibration*, Vol. 267, (no. 5), 1029-1045, November, 2003. The non-linear frictional forces are modeled as simple static and dynamic frictional blocks.

Rock-Bit Interactions 44 model the formation-bit interaction. The bit lateral dynamics and, in turn, the dynamics of drilling assembly 20 cannot be fully described without accurately modeling the interaction of the bit with the formation. In certain embodiments, this subsystem models these interactions based on the methodology described in the Christoforou et al Article described above. For the purposes of this example, the bit type is assumed as a PDC bit and the corresponding weight-on-bit ("WOB"), torque-on-bit ("TOB") and rate-of-penetration ("ROP") are estimated. These estimates couple the dynamics of bit 30 across all four axes of motion, as shown in FIG. 2.

Illustrative Specification of a Drilling Assembly:

To model a drilling assembly, specifications of an actual drilling system were used as tabulated in Table 1 below. An illustrative drilling assembly was divided into its main components: the PDC type bit, the point the bit system, the drill collars, a downhole measurement and optimization tool, and a stabilizer. Further, the point the bit system had one or more external stabilizers (one stabilizer embodiment used during modeling). It was therefore, further divided into three sections: a section before the stabilizer, the stabilizer and the section after the stabilizer. Each section was assumed to be a hollow cylindrical beam with sections having—in general—different cross-sectional areas, lengths, and mass densities. For the implementation using the lumped parameter method, each section was divided into mass-spring systems, such that the distance of separation between two successive mass-spring systems was not greater than 1 m. However, for the bit, a single mass system was assumed because of the small length and high stiffness of the bit in comparison to other sections of the drilling assembly.

The sections (as well as masses within the sections) were connected through spring and dampers with coefficients determined according Equations 10 and 11. All the components of the drilling assembly were assumed to be made up of steel and the steel's material properties (i.e., Young's modulus, shear Modulus, and density) and were used for the parameter estimation. For this model, masses, moments of inertia, spring, and damping constants were assumed to be uniformly distributed along each section. This procedure was performed across all the four axes of motion (x, y, z, and φ).

TABLE 1

Specification of Drilling Assembly Based on an Actual Drilling System

| Part Description | Outer dia. (in) | Inner dia. (in) | Length (ft) | Linear Mass Density (lb/ft) |
|---|---|---|---|---|
| PDC bit | 16.5 | 2.375 | 2.7 | 704.62 |
| Point the bit system (before stabilizer) | 9.625 | 2.375 | 12.5 | 156.45 |
| Stabilizer | 9.625 | 2.375 | 4 | 156.45 |
| Point the bit system (after stabilizer) | 9.625 | 2.375 | 5.24 | 156.45 |
| Crossover sub | 9.5 | 2.875 | 3.76 | 219.44 |
| Drill collar | 9.5 | 4.125 | 9.2 | 208.4 |
| Drill DOC ® | 9.5 | 2.370 | 10.57 | 108.41 |
| Drill collar | 9.5 | 2.375 | 27.14 | 250 |
| Stabilizer | 9.5 | 2.375 | 3.84 | 220 |
| Drillstring | 6.625 | 5.965 | 10000 | 142.58 |

Results:

Simulation results for two conditions for desired top drive speeds, namely low (3 rad/s), and high (12 rad/s) at a constant drawworks load of 300 kN are described in this example. The stiffness of the rock formation to determine the forces at the bit is set to 100 MN/m. The results of the simulation are shown in FIGS. 4 and 5, which show results of a predictive model of a drilling assembly generated using illustrative embodiments of the present disclosure. It should be noted that the main objective of this modeling example is to replicate the bit vibrations. Because of the lack of the rock-bit interaction data in this example, the following results should be interpreted in a qualitative sense.

Figure 4A:
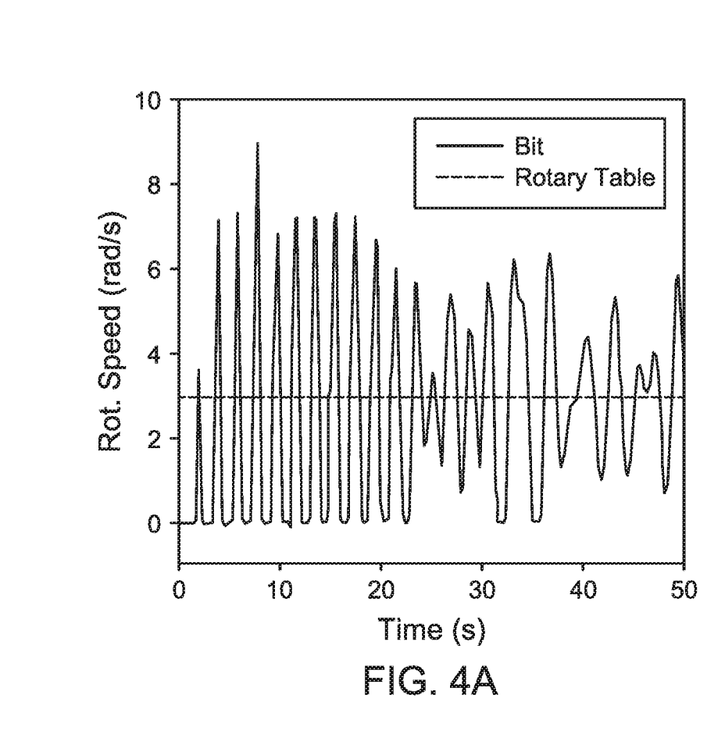
FIGS. 4 and 5 are graphs representing results of a predictive model of a drilling assembly generated using illustrative embodiments of the present disclosure.
Figure 5A:
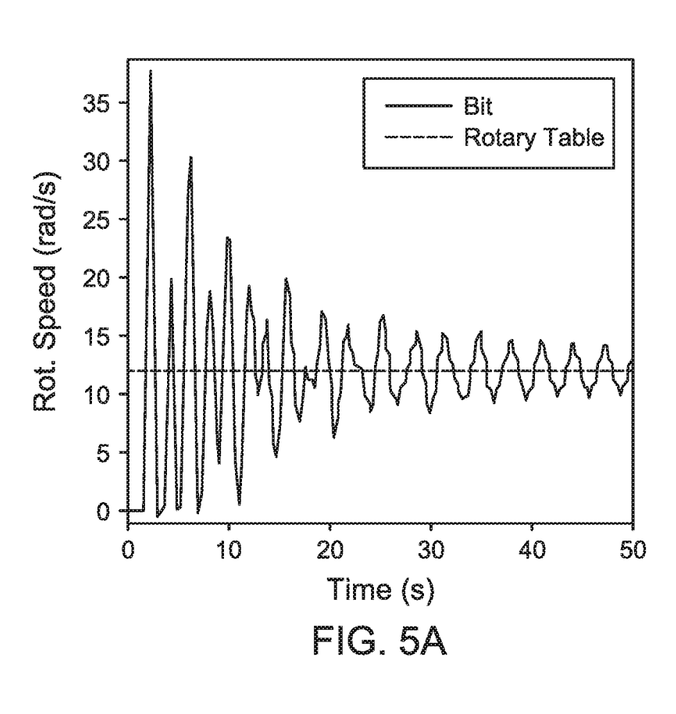

FIG. 4A shows the bit rotational speed response for the low value (3 rad/s) of top drive speed. It can be seen that the torsional vibrations, also known as slick/slip vibrations, are prominent and sustain for a longer period of time. The stick/slip vibrations arise because the frictional forces between the drilling assembly and the wellbore, causing it to alternatively stop and slip at high angular velocities. The stick/slip vibrations die out upon increasing the desired rotary table speed, as shown in FIG. 5A. Field experience confirms this dynamic behavior.

Figure 4B:
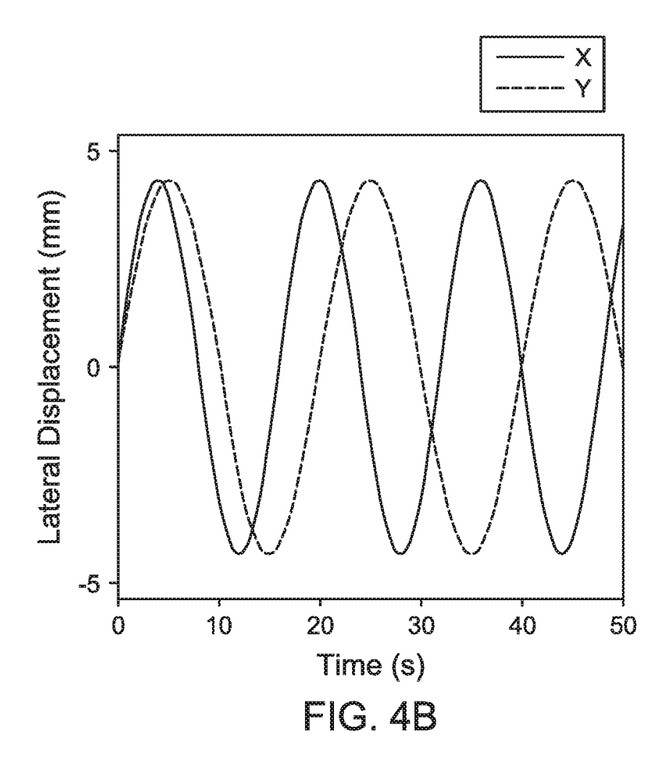
Figure 5B:
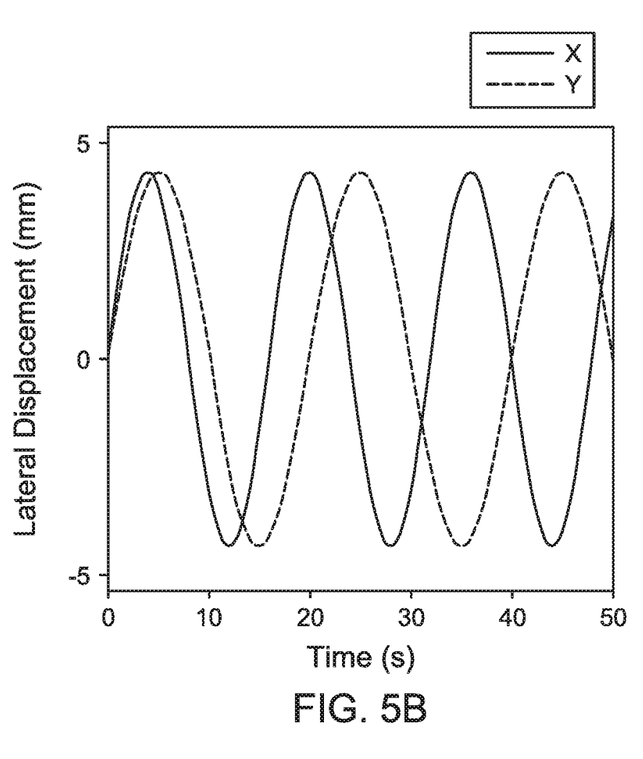

The model also predicts that the lateral vibrations, known within the industry as whirl, and are shown in FIGS. 4B and 5B, respectively, for the two rotational speeds. The source of these vibrations is the bending of the various components of the drilling assembly and the drill pipe.

Figure 4C:
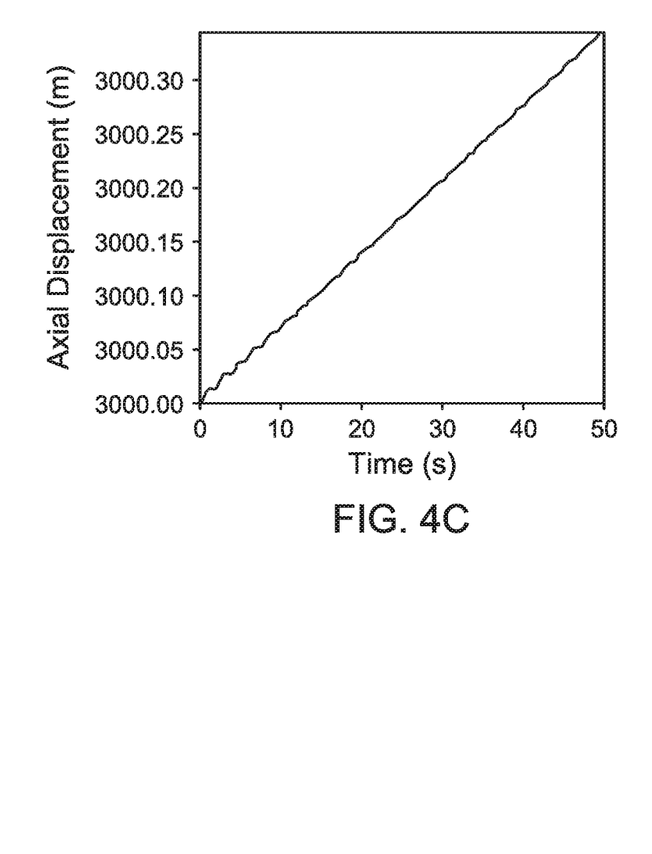
Figure 4D:
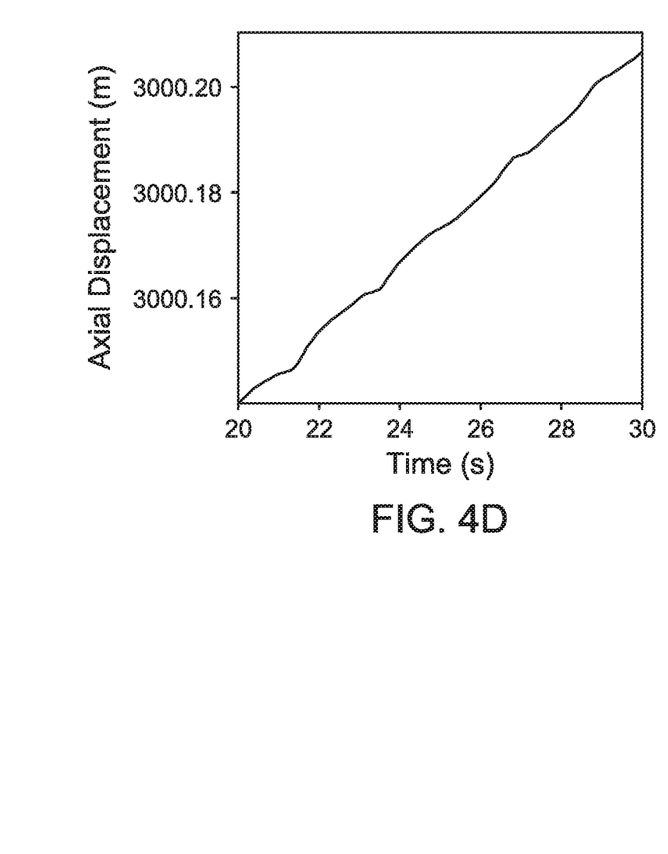
Figure 5C:
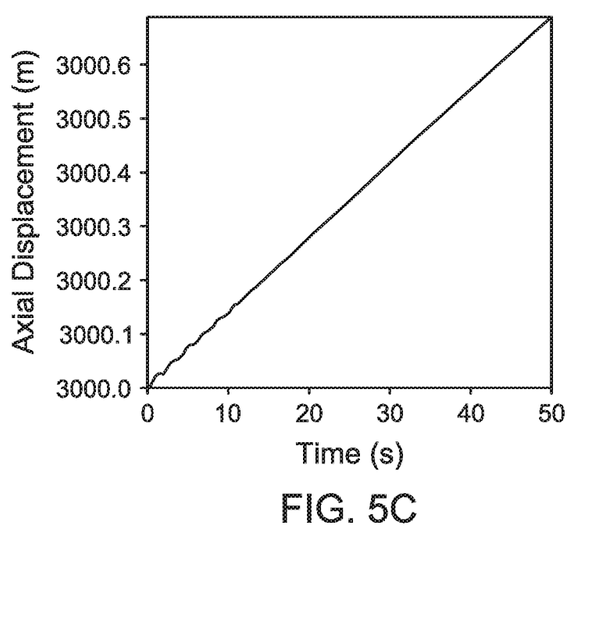
Figure 5D:
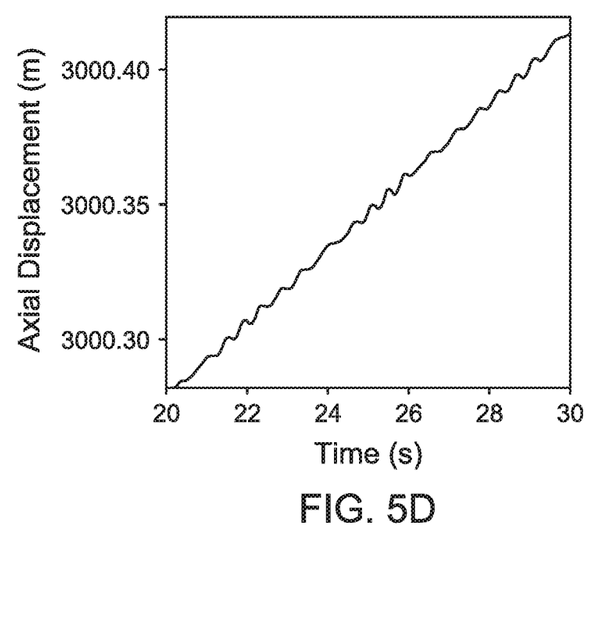

The axial displacement of the bit is shown in FIG. 4C for the 3 rad/s case, and in FIG. 5C for the 12 rad/s case. The corresponding magnified plots are shown in FIGS. 4D and 5D. The axial vibrations, or bit bounce, are present in both the cases, more pronounced while the bit is undergoing stick/slip vibrations. These are mostly caused by the interaction between the drill bit and the bottom of the wellbore. In extreme cases, the bit can lose contact with the hole bottom, thereby decreasing the efficiency of the drilling operation, and can lead to bit destruction.

The presence of these downhole vibrations can not only create a non-uniform borehole, but can also have detrimental effects on the drillstring, the bit, and the BHA components, leading to their ultimate failure.

Accordingly, through use of the foregoing illustrative methodology, path smoothing engine 110, via predictive module 112 models a future path of a drilling assembly using four degrees of freedom. Because the thickness of the drilling assembly is much smaller than its length, the bending in the lateral direction may be modeled using the shear beam theory. A lumped-parameter method is also utilized that discretizes the drilling assembly into a (small) number of mass-spring systems. As a result, predictive module 112 generates a simulation that can predict the three most common types of vibrations. However, in an alternate embodiment, the bending dynamics along with the rotational and axial dynamics can be solved using FEM, as will be understood by those ordinarily skilled in the art having the benefit of this disclosure.

Figure 6:
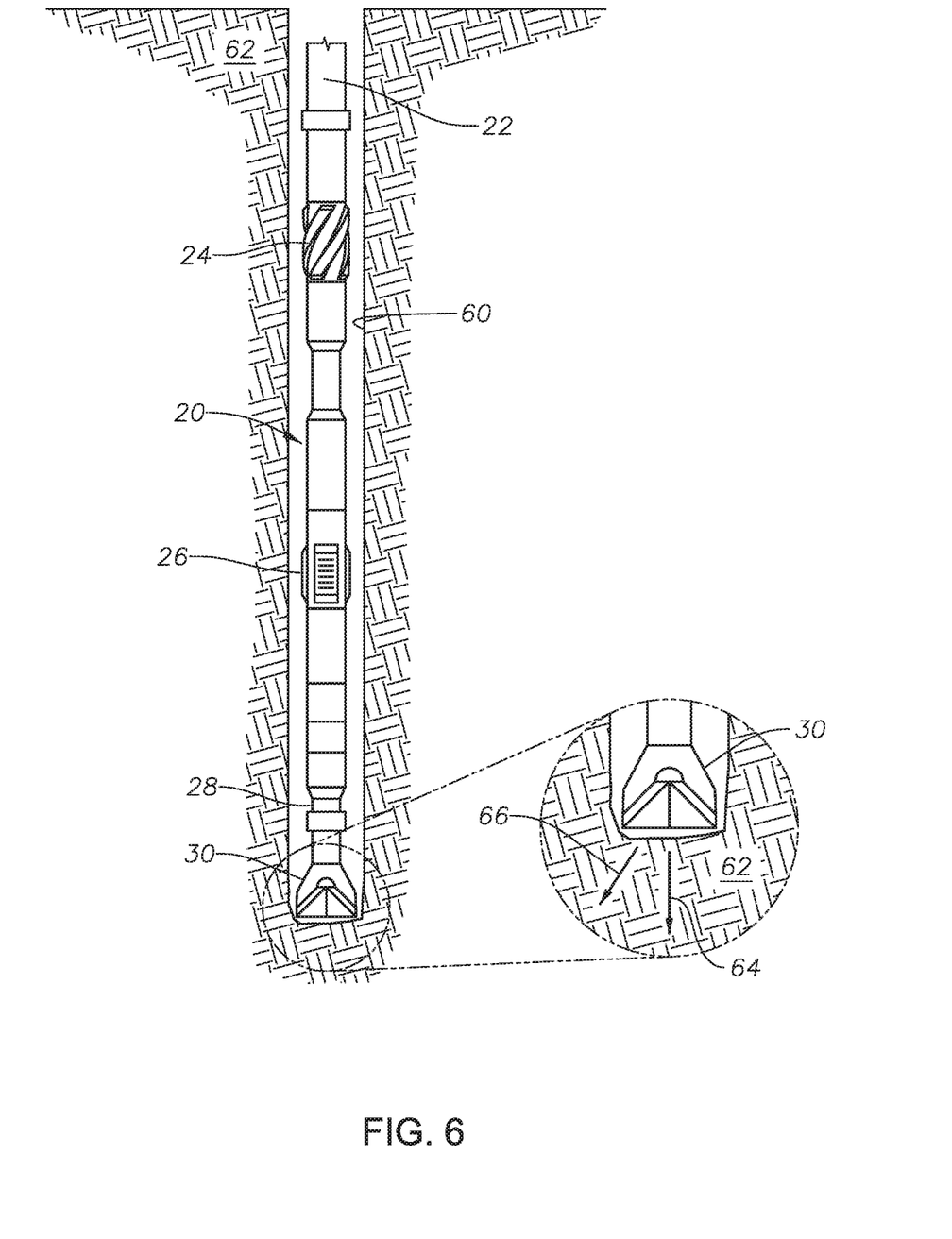
FIG. 6 illustrates a drilling assembly drilling a wellbore along a predetermined well path, according to certain illustrative embodiments of the present disclosure.
Figure 7:
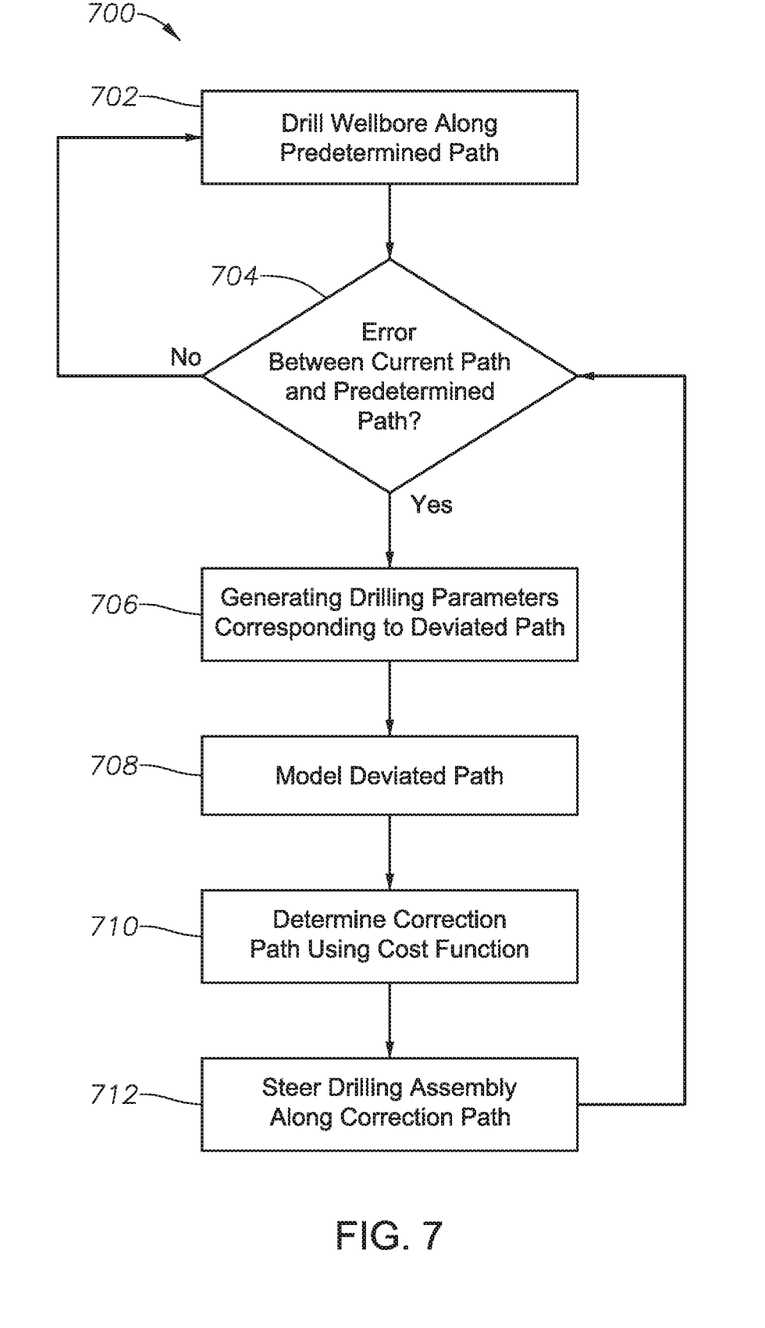
FIG. 7 is a flow chart of an illustrative path smoothing method applied according to certain illustrative embodiments of the present disclosure.

Now that an illustrative method by which predictive module 112 generates a dynamic model has been described, various methodologies of the present disclosure will now be described. FIG. 6 illustrates drilling assembly 20 drilling a wellbore along a predetermined well path, according to an illustrative embodiment of the present disclosure. FIG. 7 is a flow chart of an illustrative path smoothing method 700 utilized by drilling system 20. With reference to FIGS. 6 and 7, during drilling operations, drilling assembly 20 drills wellbore 60 in formation 62 along a predetermined well path 64 at block 702. However, due to the formation-bit interaction, and other downhole phenomena, drilling assembly 20 has a tendency to deviate from, or "walk" off, predetermined well path 64, also referred to as walk tendency 66. All the while during drilling operations, drilling assembly 20 is in continuous communication with well path smoothing system 100 to communicate drilling parameters and other downhole data. In certain embodiments, well path smoothing system 100 may reside in local storage within drilling assembly 20, while in others it may reside at some remote location (surface, for example) and communicate downhole via a suitable wired or wireless method.

As illustrated in FIG. 1, path smoothing engine 110 essentially embodies a control system comprising three main components: a dynamic predictive model (embodied in predictive module 112), optimizer (embodied in optimization module 114), and a feedback to update the model (embodied in steering module 116). Thus, at block 704, path smoothing engine 110 continuously monitors data from drilling assembly 20 to determine if there is a distinction or error between the current well path and the predetermined well path 64, as would be understood by those ordinarily skilled in the art having the benefit of this disclosure. If the determination is "NO," the algorithm returns to block 702 and continues once again. However, if the determination is "YES," the algorithm continues on to block 706.

At block 706, when drilling assembly 20 begins to deviate from predetermined well path 64, the corresponding orientation data and other drilling parameters are generated by steering module 116 and communicated to path predictive module 112. Such data may include, for example, the four degrees of motion previously described (rotational motion, φ, axial motion, z; and bending motions along the two lateral directions, x and y), in addition to weight on bit, RPM, velocity etc.). Such data is provided to path smoothing engine 110 in order to indicate an error between the predetermined well path 64 and current deviated path 66.

At block 708, predictive module 112 then utilizes the drilling parameters to model the deviated well path, as previously described herein. The dynamic model generated by predictive module 112 is utilized to predict what the deviated well path will be based upon the various drilling parameters and other inputs. At block 710, optimization module 114 then utilizes a cost function and constraints to evaluate various possible candidate well paths (based on the predictive model) to determine the most optimal path to return the drilling assembly back to the originally planned path. In certain embodiments, the cost function balances competing constraints, which when taken as a whole, results in a smoothed correction path that minimizes tortuosity. An illustrative cost function may be:

$$\min\left((x-x^*)^2 + (y-y^*)^2 + (z-z^*)^2 + Q\left(a\left(\frac{dx}{dt} - \frac{dx^*}{dt}\right)^2 + b\left(\frac{dy}{dt} - \frac{dy^*}{dt}\right)^2 + c\left(\frac{dz}{dt} - \frac{dz^*}{dt}\right)^2\right) + k(u^2) + h\left(\frac{dwear}{dt}\right)\right),$$ Eq. (12)

where x*, y* and z* are the desired predetermined paths; Q, a, b and c are weighting factors, u is input energy (of drilling assembly) with a weighting factor k, and h is the weighting factor on the wear rate of bit 30. Here, Cartesian coordinates may be used, although polar, spherical or cylindrical may also be utilized. The illustrative cost function is designed to minimize the difference in the actual (deviated path 66) and desired (predetermined path 64) paths, in addition to the difference between the deviated to premature well path curvatures. These concepts are contradictory since, if there is a deviation, the fastest way to correct the action would be to have a maximum curvature directly back to the desired path, and not to follow the desired curvature of predetermined path 64. However, use of the cost function will result in a smooth correction path back to predetermined path 64, in addition to allowing the weighting factors to control the amount of smoothing.

Moreover, since the predictive model generated by predictive module 112 predicts forward into the future and allows control of various inputs relative to that prediction, oscillation normally seen in an error driving controller with physical non-linear feedback will be reduced and/or alleviated. In this illustrate embodiment, the minimization of the input energy u is to ensure that the correction path is easy to drill. In other words, u allows path smoothing engine 110 to take into account the energy necessary to steer drilling assembly 20 back to predetermined path 64. Additionally, dwear provides an optimization around the wear rate such that candidate correction paths will not be followed if they cause a large increase in wear (e.g., cutting rock at angle that is detrimental to bit life).

Still referring to the illustrative cost function above, weighting factors a, b, and c are utilized by path smoothing engine 110 to differentiate the importance of the path to curvature behavior. As understood by those ordinarily skilled persons described herein, the path is the desired path which includes location and curvature, while the curvature is the bending of the path, but not the location (position and slope vs. slope). For example, if drilling assembly 20 needs to tightly maintain a path in the z direction, but moving along the x-y plane is of less concern, the gain c would be smaller than a and b. This illustrative embodiment uses drilling parameters related to position and velocity in the cost function, however other embodiments may utilize acceleration, as will be understood by those ordinarily skilled in the art having the benefit of this disclosure.

In other illustrative embodiments, the weighting factors may be designed to change dependent on the environment, such as the rock hardness. For example, if the formation is hard, and drilling assembly 20 is below the desired pathway, the path smoothing engine 110 will reduce the weighting factor on the path following portion (possibly to zero), and increase the weighting factor on the slope. This would cause the tool face to stay relatively constant. Once through this hard region, the weighting factors will return to normal, and the path will return to the predetermined path.

Alternatively, the weighting factors can also be changed relative to how well the model predicts the behavior. For example, if the model has high uncertainty due to high noise in the accelerometers (or other sensors), path smoothing engine 110 may change the weighting factors. Here, the weighting factors can be changed such that they reduce the BHA bend by drilling a straight hole by reducing the path following and slope following factors, and increase the weighting factor that correlates to the signal noise level, in certain embodiments. This would cause the tool face to move such that the vibrations are minimized, which will clean up the signal, and allow the system to improve the model while reducing the uncertainty. Moreover, in those applications where the predictive model would need time to adapt, aggressive changes to the weighting factors would not be necessary.

In yet other embodiments, constraints may be added to the cost function to thereby limit the drilling parameters. Such constraints may include, for example, input limits corresponding to the angle of steering, rates of change limits (angular velocity of steering mechanism, for example), limits on the rate of change of curvature, etc. In such embodiments, the optimization will include limits in the solution along with the cost function.

As stated above, the cost function is designed to minimize differences between the predetermined and deviated paths 64, 66. At block 710, optimization module 114 utilizes the cost function and the predictive model of the dynamics to generate and evaluate the various candidate correction paths. In doing so, certain embodiments of optimization module 114 utilizes an adaptive parametric controller to analyze the drilling parameters of the candidate correction paths using the cost function. Here, for example, the difference between where the drilling assembly is, and the original desired path is measured. Such measurement may be achieved using total depth where, for example, the assembly is at 5000 feet and should be 1000 feet east, but is instead only 900 feet east—this is the error. Using the model of the dynamics, and the cost function, optimization module 114 calculates the optimal path forward that minimizes the cost function. The output of this is the tool face, which is the way the bit is facing. The path smoothing engine may use a variety of approaches to search for the minimal point, such as, for example, a gradient search, or some other optimization method.

Thereafter, the drilling parameters corresponding to the most optimal correction path are communicated to steering module 116, whereby steering inputs are communicated to the steering mechanism of drilling assembly 20 to thereby orient it accordingly. Once the drilling assembly has been oriented, it begins to drill along the correction path at block 712. Predictive module 112 continues to map the walk tendencies of drilling assembly 20 and correct them accordingly, as previously described.

At certain times during drilling operations, drilling assembly 20 may not track the correction path perfectly. Since the rock formation is heterogeneous and the drill bit dynamics can change with time due to wear, drilling system 20 will experience drift. However, through use of the cost function, path smoothing engine 110 allows for some drift while it predetermines the predictive model properties without creating a tortuous path. Path smoothing engine 110 may allow for the drift in some embodiments by holding the tool face steady and making no changes, until it determines the model to some specified level of certainty (e.g., how well the model output matches the measurements).

The foregoing methods and systems described herein are particularly useful in altering and/or drilling wellbores. As described, the system provides a method by which to improve wellbore smoothness and thereby reduce drag and allow for longer wells. It will also reduce unwanted behavior, such as stuck pipe, die to wellbore smoothness. Accordingly, through use of the predictive model and cost function, a wellbore may be planned, drilled/geo-steered in real-time and/or a well path may be altered.

Embodiments described herein further relate to any one or more of the following paragraphs:

1. A computer-implemented method to steer a downhole drilling assembly, the method comprising drilling a wellbore along a predetermined path using the drilling assembly; receiving data indicative of a deviation from the predetermined path; generating drilling parameters that correspond the deviated path; modeling the deviated path of the drilling assembly based upon the drilling parameters; determining a correction path of the drilling assembly using a cost function that takes into account both: a difference between the predetermined and deviated paths; and a difference between curvatures of the predetermined and deviated paths; and steering the drilling assembly along the correction path.

2. A computer-implemented method as defined in paragraph 1, wherein determining the correction path further comprises: utilizing the cost function to minimize the differences between the predetermined and deviated paths; utilizing the cost function to minimize the differences between the curvatures of the predetermined and deviated paths; and determining corrective drilling parameters that correspond to each minimization, wherein the drilling assembly is steered along the correction path using the corrective drilling parameters.

3. A computer-implemented method as defined in any of paragraphs 1-2, further comprising utilizing weighting factors in the cost function to determine the correction path.

4. A computer-implemented method as defined in any of paragraphs 1-3, wherein the cost function takes into account drilling parameters corresponding to a position of the drilling assembly; a velocity of the drilling assembly; input energy necessary to drill along the correction path; and wear on a bit of the drilling assembly.

5. A computer-implemented method as defined in any of paragraphs 1-4, wherein the cost function takes into account drilling parameters corresponding to an acceleration of the drilling assembly.

6. A computer-implemented method as defined in any of paragraphs 1-5, wherein determining the corrective drilling parameters further comprises limiting the corrective drilling parameters based upon at least one of: a maximum steering angle of the drilling assembly; a maximum rate of change of the steering angle; and a maximum rate of change in curvature.

7. A computer-implemented method as defined in any of paragraphs 1-6, wherein modeling the deviated path further comprises: analyzing a tool face of a bit of the drilling assembly; and modeling a cutting trajectory of the drilling assembly based on the tool face in real-time.

8. A computer-implemented method as defined in any of paragraphs 1-7, wherein the cost function is defined as:

$$\min\left((x-x^*)^2 + (y-y^*)^2 + (z-z^*)^2 + Q\left(a\left(\frac{dx}{dt} - \frac{dx^*}{dt}\right)^2 + b\left(\frac{dy}{dt} - \frac{dy^*}{dt}\right)^2 + c\left(\frac{dz}{dt} - \frac{dz^*}{dt}\right)^2\right) + k(u^2) + h\left(\frac{dwear}{dt}\right)\right)$$

9. A computer-implemented method to steer a downhole drilling assembly, the method comprising: drilling a wellbore along a predetermined path using the drilling assembly; receiving data indicative of a deviation from the predetermined path; determining a correction path that returns the drilling assembly to the predetermined path, the determination of the correction path comprising balancing competing constraints corresponding to path and curvature behavior of the predetermined and deviated paths to thereby minimize tortuosity; and steering the drilling assembly along the correction path.

10. A computer-implemented method as defined in paragraph 9, wherein receiving data indicative of the deviation from the predetermined path further comprises: generating drilling parameters that correspond to the deviation; and modeling a deviated path of the drilling assembly based upon the drilling parameters, wherein determination of the correction path is accomplished using the modeled deviated path.

11. A computer-implemented method as defined in any of paragraphs 9-10, wherein determination of the correction path further comprises utilizing a cost function to optimize the correction path, the cost function minimizing differences between the path and curvature behavior of the predetermined and deviated paths.

12. A computer-implemented method as defined in any of paragraphs 9-11, wherein the cost function comprises variables related to at least one of: a position of the drilling assembly; a velocity of the drilling assembly; input energy necessary to drill along the correction path; and wear on a bit of the drilling assembly.

13. A computer-implemented method as defined in any of paragraphs 9-12, wherein determination of the correction path further comprises limiting the correction path using drilling parameter constraints.

Furthermore, the illustrative methodologies described herein may be implemented by a system comprising processing circuitry or a computer program product comprising instructions which, when executed by at least one processor, causes the processor to perform any of the methodology described herein.

Although various embodiments and methodologies have been shown and described, the disclosure is not limited to such embodiments and methodologies and will be understood to include all modifications and variations as would be apparent to one skilled in the art. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. A computer-implemented method to steer a downhole drilling assembly, the method comprising:
   drilling a wellbore along a predetermined path using the drilling assembly;
   receiving, using a computer system, data indicative of a deviation from the predetermined path;
   generating, using the computer system, drilling parameters that correspond the deviated path;
   modeling, using the computer system, the deviated path of the drilling assembly based upon the drilling parameters;
   determining, using the computer system, a correction path of the drilling assembly using a cost function that takes into account both:
      a difference between the predetermined and deviated paths; and
      a difference between curvatures of the predetermined and deviated paths; and
   steering the drilling assembly along the correction path.

2. A computer-implemented method as defined in claim 1, wherein determining the correction path further comprises:
   utilizing the cost function to minimize the differences between the predetermined and deviated paths;
   utilizing the cost function to minimize the differences between the curvatures of the predetermined and deviated paths; and
   determining corrective drilling parameters that correspond to each minimization, wherein the drilling assembly is steered along the correction path using the corrective drilling parameters.

3. A computer-implemented method as defined in claim 2, wherein determining the correction path further comprises utilizing weighting factors in the cost function.

4. A computer-implemented method as defined in claim 2, wherein determining the corrective drilling parameters further comprises limiting the corrective drilling parameters based upon at least one of:
   a maximum steering angle of the drilling assembly;
   a maximum rate of change of the steering angle; and
   a maximum rate of change in curvature.

5. A computer-implemented method as defined in claim 1, wherein the cost function takes into account drilling parameters corresponding to:
   a position of the drilling assembly;
   a velocity of the drilling assembly;
   input energy necessary to drill along the correction path; and
   wear on a bit of the drilling assembly.

6. A computer-implemented method as defined in claim 5, wherein the cost function takes into account drilling parameters corresponding to an acceleration of the drilling assembly.

7. A computer-implemented method as defined in claim 1, wherein modeling the deviated path further comprises:
   analyzing a tool face of a bit of the drilling assembly; and
   modeling a cutting trajectory of the drilling assembly based on the tool face in real-time.

8. A computer-implemented method as defined in claim 1, wherein the cost function is defined as:

$$\min\left((x-x^*)^2 + (y-y^*)^2 + (z-z^*)^2 + Q\left(a\left(\frac{dx}{dt}-\frac{dx^*}{dt}\right)^2 + b\left(\frac{dy}{dt}-\frac{dy^*}{dt}\right)^2 + c\left(\frac{dz}{dt}-\frac{dz^*}{dt}\right)^2\right) + k(u^2) + h\left(\frac{dwear}{dt}\right)\right),$$

wherein x, y, and z are directional components of the deviated path, x*, y*, and z* are directional components of the predetermined path, Q, a, b, c, k, and h are weighting factors, u is input energy of drilling assembly, wear is a wear rate of a bit of the drilling assembly, and d/dt indicates derivative as a function of time.

9. A system comprising processing circuitry to implement the method in any one of claims 1-8.

10. A non-transitory computer-readable medium having stored thereon computer-readable instructions executable to cause a computer to perform the method in any one of claims 1-8.

11. A computer-implemented method to steer a downhole drilling assembly, the method comprising:
   drilling a wellbore along a predetermined path using the drilling assembly;
   receiving, using a computer system, data indicative of a deviation from the predetermined path;
   determining, using the computer system, a correction path that returns the drilling assembly to the predetermined path, the determination of the correction path comprising balancing competing constraints corresponding to path and curvature behavior of the predetermined and deviated paths to thereby minimize tortuosity; and
   steering the drilling assembly along the correction path.

12. A computer-implemented method as defined in claim 11, wherein receiving data indicative of the deviation from the predetermined path further comprises:
   generating drilling parameters that correspond to the deviation; and modeling a deviated path of the drilling assembly based upon the drilling parameters, wherein determination of the correction path is accomplished using the modeled deviated path.

13. A computer-implemented method as defined in claim 11, wherein determination of the correction path further comprises utilizing a cost function to optimize the correction path, the cost function minimizing differences between the path and curvature behavior of the predetermined and deviated paths.

14. A computer-implemented method as defined in claim 13, wherein the cost function comprises variables related to at least one of:

a position of the drilling assembly;

a velocity of the drilling assembly;

input energy necessary to drill along the correction path; and wear on a bit of the drilling assembly.

15. A computer-implemented method as defined in claim 11, wherein determination of the correction path further comprises limiting the correction path using drilling parameter constraints.

* * * * *